US 8,878,440 B2

(12) United States Patent
Reed

(10) Patent No.: US 8,878,440 B2
(45) Date of Patent: Nov. 4, 2014

(54) LUMINAIRE WITH ATMOSPHERIC ELECTRICAL ACTIVITY DETECTION AND VISUAL ALERT CAPABILITIES

(71) Applicant: Express Imaging Systems, LLC, Seattle, WA (US)

(72) Inventor: William G. Reed, Seattle, WA (US)

(73) Assignee: Express Imaging Systems, LLC, Seattle, WA (US)

( * ) Notice: Subject to any disclaimer, the term of this patent is extended or adjusted under 35 U.S.C. 154(b) by 57 days.

(21) Appl. No.: 13/786,114

(22) Filed: Mar. 5, 2013

(65) Prior Publication Data

US 2014/0062312 A1    Mar. 6, 2014

Related U.S. Application Data

(60) Provisional application No. 61/694,159, filed on Aug. 28, 2012.

(51) Int. Cl.
H05B 37/02          (2006.01)

(52) U.S. Cl.
CPC ........ H05B 37/0209 (2013.01); H05B 37/0218 (2013.01)
USPC ........... 315/158; 315/130; 315/152; 315/210; 340/601; 340/602

(58) Field of Classification Search
USPC ............. 315/158, 130, 152, 210; 340/539.28, 340/601, 602; 356/28, 28.5
See application file for complete search history.

(56) References Cited

U.S. PATENT DOCUMENTS

| 4,153,927 | A | 5/1979 | Owens |
| 4,237,377 | A | 12/1980 | Sansum |
| 5,086,379 | A | 2/1992 | Denison et al. |
| 5,160,202 | A | 11/1992 | Légaré |
| 5,230,556 | A | 7/1993 | Canty et al. |

(Continued)

FOREIGN PATENT DOCUMENTS

| DE | 4001980 A1 | 8/1990 |
| EP | 1 734 795 A1 | 12/2006 |

(Continued)

OTHER PUBLICATIONS

"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.

(Continued)

*Primary Examiner* — Vibol Tan
(74) *Attorney, Agent, or Firm* — Seed IP Law Group PLLC

(57) ABSTRACT

An illumination system can provide at least a first state and a second state of a luminaire equipped with at least one lighting subsystem. In the first state, the luminous intensity of the lighting subsystem is controlled based on the occurrence of a detected solar event or the occurrence of an expected solar event. In the second state, the luminous intensity of the lighting subsystem forms a visually distinct pattern based on the detection of atmospheric electrical activity exceeding a defined threshold by an electrical activity sensor disposed within the luminaire. The visually distinctive luminous output can alert persons within line of sight of the luminaire of the proximity of threatening atmospheric electrical activity.

29 Claims, 4 Drawing Sheets

(56) References Cited

U.S. PATENT DOCUMENTS

| | | | |
|---|---|---|---|
| 5,276,385 | A | 1/1994 | Itoh et al. |
| 5,343,121 | A | 8/1994 | Terman et al. |
| 5,349,505 | A | 9/1994 | Poppenheimer |
| 5,450,302 | A | 9/1995 | Maase et al. |
| 5,561,351 | A | 10/1996 | Vrionis et al. |
| 5,589,741 | A | 12/1996 | Terman et al. |
| 6,612,720 | B1 | 9/2003 | Beadle |
| 6,753,842 | B1 | 6/2004 | Williams et al. |
| 6,828,911 | B2 * | 12/2004 | Jones et al. ............. 340/601 |
| 6,841,947 | B2 | 1/2005 | Berg-johansen |
| 6,902,292 | B2 | 6/2005 | Lai |
| 7,019,276 | B2 | 3/2006 | Cloutier et al. |
| 7,066,622 | B2 | 6/2006 | Alessio |
| 7,122,976 | B1 | 10/2006 | Null et al. |
| 7,188,967 | B2 | 3/2007 | Dalton et al. |
| 7,196,477 | B2 | 3/2007 | Richmond |
| 7,239,087 | B2 | 7/2007 | Ball |
| 7,252,385 | B2 | 8/2007 | Engle et al. |
| 7,258,464 | B2 | 8/2007 | Morris et al. |
| 7,281,820 | B2 | 10/2007 | Bayat et al. |
| 7,314,291 | B2 | 1/2008 | Tain et al. |
| 7,317,403 | B2 | 1/2008 | Grootes et al. |
| 7,322,714 | B2 | 1/2008 | Barnett et al. |
| 7,339,323 | B2 | 3/2008 | Bucur |
| 7,339,471 | B1 | 3/2008 | Chan et al. |
| 7,405,524 | B2 | 7/2008 | Null et al. |
| 7,438,440 | B2 | 10/2008 | Dorogi |
| 7,440,280 | B2 | 10/2008 | Shuy |
| 7,468,723 | B1 | 12/2008 | Collins |
| 7,524,089 | B2 | 4/2009 | Park |
| 7,538,499 | B2 | 5/2009 | Ashdown |
| 7,578,596 | B2 | 8/2009 | Martin |
| 7,578,597 | B2 | 8/2009 | Hoover et al. |
| 7,627,372 | B2 | 12/2009 | Vaisnys et al. |
| 7,631,324 | B2 | 12/2009 | Buonasera et al. |
| 7,633,463 | B2 | 12/2009 | Negru |
| 7,677,753 | B1 | 3/2010 | Wills |
| 7,688,002 | B2 | 3/2010 | Ashdown et al. |
| 7,688,222 | B2 | 3/2010 | Peddie et al. |
| 7,703,951 | B2 | 4/2010 | Piepgras et al. |
| 7,804,200 | B2 | 9/2010 | Flaherty |
| 7,834,922 | B2 | 11/2010 | Kurane |
| 7,932,535 | B2 | 4/2011 | Mahalingam et al. |
| 7,940,191 | B2 | 5/2011 | Hierzer |
| 7,952,609 | B2 | 5/2011 | Simerly et al. |
| 7,960,919 | B2 | 6/2011 | Furukawa |
| 7,985,005 | B2 | 7/2011 | Alexander et al. |
| 8,100,552 | B2 | 1/2012 | Spero |
| 8,118,456 | B2 | 2/2012 | Reed et al. |
| 8,143,769 | B2 | 3/2012 | Li |
| 8,174,212 | B2 | 5/2012 | Tziony et al. |
| 8,334,640 | B2 | 12/2012 | Reed et al. |
| 2002/0113192 | A1 | 8/2002 | Antila |
| 2004/0192227 | A1 | 9/2004 | Beach et al. |
| 2006/0014118 | A1 | 1/2006 | Utama |
| 2006/0066264 | A1 | 3/2006 | Ishigaki et al. |
| 2007/0102033 | A1 | 5/2007 | Petrocy |
| 2008/0018261 | A1 | 1/2008 | Kastner |
| 2008/0043106 | A1 | 2/2008 | Hassapis et al. |
| 2008/0130304 | A1 | 6/2008 | Rash et al. |
| 2008/0266839 | A1 | 10/2008 | Claypool et al. |
| 2009/0160358 | A1 | 6/2009 | Leiderman |
| 2009/0161356 | A1 | 6/2009 | Negley et al. |
| 2009/0167203 | A1 | 7/2009 | Dahlman et al. |
| 2009/0230883 | A1 | 9/2009 | Haug |
| 2009/0261735 | A1 | 10/2009 | Sibalich et al. |
| 2009/0278479 | A1 | 11/2009 | Platner et al. |
| 2009/0284155 | A1 | 11/2009 | Reed et al. |
| 2010/0052557 | A1 | 3/2010 | Van Der Veen et al. |
| 2010/0123403 | A1 | 5/2010 | Reed |
| 2010/0171442 | A1 | 7/2010 | Draper et al. |
| 2010/0259193 | A1 | 10/2010 | Umezawa et al. |
| 2010/0271802 | A1 | 10/2010 | Recker et al. |
| 2010/0277082 | A1 | 11/2010 | Reed et al. |
| 2010/0295454 | A1 * | 11/2010 | Reed ............. 315/152 |
| 2010/0295455 | A1 | 11/2010 | Reed |
| 2010/0295946 | A1 | 11/2010 | Reed et al. |
| 2011/0001626 | A1 | 1/2011 | Yip et al. |
| 2011/0006703 | A1 | 1/2011 | Wu et al. |
| 2011/0026264 | A1 | 2/2011 | Reed et al. |
| 2011/0175518 | A1 | 7/2011 | Reed et al. |
| 2011/0221346 | A1 | 9/2011 | Lee et al. |
| 2011/0251751 | A1 * | 10/2011 | Knight ............. 701/33 |
| 2011/0310605 | A1 | 12/2011 | Renn et al. |
| 2012/0169053 | A1 * | 7/2012 | Tchoryk et al. ............. 290/44 |
| 2012/0262069 | A1 * | 10/2012 | Reed ............. 315/130 |
| 2013/0043792 | A1 | 2/2013 | Reed |
| 2013/0049613 | A1 | 2/2013 | Reed |
| 2013/0141000 | A1 | 6/2013 | Wei et al. |
| 2013/0141010 | A1 | 6/2013 | Reed et al. |
| 2013/0163763 | A1 | 6/2013 | Reed |
| 2013/0229518 | A1 | 9/2013 | Reed et al. |
| 2013/0340353 | A1 * | 12/2013 | Whiting et al. ............. 52/19 |

FOREIGN PATENT DOCUMENTS

| | | |
|---|---|---|
| FR | 2 883 306 A1 | 9/2006 |
| JP | 6-335241 A | 12/1994 |
| JP | 2001-333420 A | 11/2001 |
| JP | 2004-279668 A | 10/2004 |
| JP | 2004-349065 A | 12/2004 |
| JP | 2005-198238 A | 7/2005 |
| JP | 2005-310997 A | 11/2005 |
| JP | 2006-179672 A | 7/2006 |
| JP | 2006-244711 A | 9/2006 |
| JP | 2008-509538 A | 3/2008 |
| JP | 2008-130523 A | 6/2008 |
| JP | 2008-159483 A | 7/2008 |
| JP | 2008-177144 A | 7/2008 |
| KR | 2005078403 A | 8/2005 |
| KR | 10-2006-0086254 A | 7/2006 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 A1 | 9/2002 |
| WO | 03/056882 A1 | 7/2003 |
| WO | 2006/057866 A2 | 6/2006 |
| WO | 2007/036873 A2 | 4/2007 |
| WO | 2008/030450 A2 | 3/2008 |
| WO | 2009/040703 A2 | 4/2009 |
| WO | 2012/006710 A1 | 1/2012 |
| WO | 2012/142115 A2 | 10/2012 |
| WO | 2014/018773 A1 | 1/2014 |
| WO | 2014/039683 A1 | 3/2014 |
| WO | 2014/078854 A1 | 5/2014 |

OTHER PUBLICATIONS

EE Herald, "Devices to protect High brightness LED from ESD," dated Mar. 16, 2009, retrieved Jun. 10, 2011, retrieved from http://www.eeherald.com/section/new-products/np100779.html, 1 page.

International Search Report, mailed Dec. 13, 2010 for PCT/US2010/035649, 3 pages.

International Search Report, mailed Dec. 15, 2010 for PCT/US2010/035658, 3 pages.

International Search Report, mailed Dec. 28, 2010 for PCT/US2010/035651, 3 pages.

International Search Report, mailed Jul. 9, 2009 for PCT/US2009/043171, 5 pages.

International Search Report, mailed Jun. 21, 2010 for PCT/US2009/064625, 3 pages.

International Search Report, mailed Oct. 8, 2012 for PCT/US2012/033059, 3 pages.

Littelfuse, "Application Note: Protecting LEDs in Product Designs," 2009, 2 pages.

Panasonic Electronic Components, "LED Lighting Solutions," 2009, 6 pages.

Renesas Electronics, "Zener Diodes for Surge Absorption—Applications of high-intensity LED," Apr. 2010, 1 page.

(56) References Cited

OTHER PUBLICATIONS

Tyco Electronics, "Circuit Protection," retrieved Jun. 10, 2011, retrieved from http://www.tycoelectronics.com/en/products/circuit-protection.html, 2 pages.
Written Opinion, mailed Dec. 13, 2010 for PCT/US2010/035649, 4 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Jul. 9, 2009 for PCT/US2009/043171, 8 pages.
Written Opinion, mailed Jun. 21, 2010 for PCT/US2009/064625, 5 pages.
Written Opinion, mailed Oct. 8, 2012 for PCT/US2012/033059, 3 pages.
Reed et al., "Apparatus and Method for Schedule Based Operation of a Luminaire" U.S. Appl. No. 13/604,327, filed Sep. 5, 2012, 44 pages.
Reed et al., "Apparatus and Method of Operating a Luminaire," U.S. Appl. No. 13/558,191, filed Jul. 25, 2012, 84 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Gas-Discharge Lamp Replacement," U.S. Appl. No. 61/052,924, filed May 13, 2008, 32 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," U.S. Appl. No. 61/051,619, filed May 8, 2008, 25 pages.
Reed et al., "Low-Profile Pathway Illumination System," Notice of Allowance, dated Oct. 14, 2011, for U.S. Appl. No. 12/437,472, 9 pages.
Reed et al., "Low-Profile Pathway Illumination System," Office Action, dated May 5, 2011, for U.S. Appl. No. 12/437,472, 24 pages.
Reed et al., "Systems and Methods That Employ Object Recognition," U.S. Appl. No. 13/411,321, filed Mar. 2, 2012, 51 pages.
Reed et al., "Apparatus, Method to Change Light Source Color Temperature With Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Electrically Isolated Heat Sink for Solid-State Light," U.S. Appl. No. 61/229,435, filed Jul. 29, 2009, 29 pages.
Reed et al., "Electrostatic Discharge Protection for Luminaire," Office Action mailed Mar. 15, 2013 for U.S. Appl. No. 13/212,074, 11 pages.
Reed et al., "Gas-Discharge Lamp Replacement With Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.
Reed et al., "Turbulent Flow Cooling for Electronic Ballast," U.S. Appl. No. 61/088,651, filed Aug. 13, 2008, 23 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Notice of Allowance mailed Apr. 12, 2013, for U.S. Appl. No. 12/784,093, 9 pages.
Reed, "Apparatus and Method of Energy Efficient Illumination," Office Action mailed Dec. 5, 2012, for U.S. Appl. No. 12/784,093, 13 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," U.S. Appl. No. 61/346,263, filed May 19, 2010, 67 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Luminaire With Ambient Sensing and Autonomous Control Capabilities," U.S. Appl. No. 13/786,332, filed Mar. 5, 2013, 86 pages.
Reed, "Resonant Network for Reduction of Flicker Perception in Solid State Lighting Systems," U.S. Appl. No. 61/527,029, filed Aug. 24, 2011, 41 pages.
Renn et al., "Solid State Lighting Device and Method Employing Heat Exchanger Thermally Coupled Circuit Board," U.S. Appl. No. 61/357,421, filed Jun. 22, 2010, 49 pages.
International Search Report, mailed Nov. 19, 2013 for PCT/US2013/052092, 4 pages.
International Search Report, mailed Dec. 30, 2013 for PCT/US2013/058266, 3 pages.
Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination Using Received Signals," Amendment filed Jan. 2, 2014, for U.S. Appl. No. 13/085,301, 26 pages.
Reed, "High Efficiency Power Controller for Luminaire," U.S. Appl. No. 61/905,699, filed Nov. 18, 2013, 5 pages.
Written Opinion, mailed Nov. 19, 2013 for PCT/US2013/052092, 7 pages.
Written Opinion, mailed Dec. 30, 2013 for PCT/US2013/058266, 8 pages.
Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.
Kadirvel et al., "Self-Powered, Ambient Light Sensor Using bq25504," Texas Instruments, Application Report, SLUA629—Jan. 2012, 6 pages.
Reed et al., "Adjustable Output Solid-State Lamp With Security Features," U.S. Appl. No. 61/561,616, filed Nov. 18, 2011, 33 pages.
Reed et al., "Long-Range Motion Detection for Illumination Control," Office Action mailed Dec. 21, 2012, for U.S. Appl. No. 12/784,080, 26 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Office Action mailed Jul. 22, 2013, for U.S. Appl. No. 12/784,080, 29 pages.
Reed et al., "Long-Range Motion Detection for Illumination Control," Amendment filed Sep. 27, 2013, for U.S. Appl. No. 12/784,080, 20 pages.
Reed et al., "Remotely Adjustable Solid-State Lamp," U.S. Appl. No. 61/641,781, filed May 2, 2012, 65 pages.
Reed et al., "Remotely Adjustable Solid-State Lamp," U.S. Appl. No. 13/875,130, filed May 1, 2013, 65 pages.
Reed, "Adjustable Output Solid-State Lighting Device," U.S. Appl. No. 61/567,308, filed Dec. 6, 2011, 49 pages.
Reed, "Apparatus and Method of Energy Efficient Illumination," Office Action mailed Dec. 5, 2012, for U.S. Appl. No. 12/784,091, 18 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Office Action mailed Apr. 24, 2013, for U.S. Appl. No. 12/784,091, 12 pages.
Reed, "Apparatus and Method of Energy Efficient Illumination," Amendment filed May 14, 2013, for U.S. Appl. No. 12/784,091, 9 pages.

(56) References Cited

OTHER PUBLICATIONS

Reed, "Apparatus and Method of Energy Efficient Illumination," Notice of Allowance mailed May 23, 2013, for U.S. Appl. No. 12/784,091, 6 pages.
Reed, "Apparatus and Method of Energy Efficient Illumination," U.S. Appl. No. 13/943,537, filed Jul. 16, 2013, 67 pages.
Reed, "Apparatus and Method of Energy Efficient Illumination Using Received Signals," Office Action mailed Oct. 1, 2013, for U.S. Appl. No. 13/085,301, 11 pages.
Reed, "Electronic Control to Regulate Power for Solid-State Lighting and Methods Thereof," Office Action mailed Feb. 28, 2013, for U.S. Appl. No. 12/619,535, 17 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Office Action mailed Jul. 30, 2013, for U.S. Appl. No. 12/619,535, 15 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance mailed Sep. 12, 2013, for U.S. Appl. No. 13/212,074, 6 pages.
Reed, "Luminaire With Ambient Sensing and Autonomous Control Capabilities," U.S. Appl. No. 61/728,150, filed Nov. 19, 2012, 83 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Switch-Mode Converter Power Monitoring," U.S. Appl. No. 61/723,675, filed Nov. 7, 2012, 73 pages.
Reed, "Luminaire With Switch-Mode Converter Power Monitoring," U.S. Appl. No. 14/074,166, filed Nov. 7, 2013, 73 pages.
Reed, "Photocontrol for Luminaire Consumes Very Low Power," U.S. Appl. No. 61/849,841, filed Jul. 24, 2013, 41 pages.
Reed, "Resonant Network for Reduction of Flicker Perception in Solid State Lighting Systems," Notice of Allowance mailed Sep. 30, 2013, for U.S. Appl. No. 13/592,590, 9 pages.
Reed, "Solid State Hospitality Lamp," U.S. Appl. No. 61/692,619, filed Aug. 23, 2012, 32 pages.
Reed, "Solid State Hospitality Lamp," U.S. Appl. No. 13/973,696, filed Aug. 22, 2013, 32 pages.
Reed, "Solid State Lighting, Drive Circuit and Method of Driving Same," U.S. Appl. No. 61/640,963, filed May 1, 2012, 24 pages.
Reed, "Solid State Lighting, Drive Circuit and Method of Driving Same," U.S. Appl. No. 13/875,000, filed May 1, 2013, 24 pages.
Written Opinion, mailed Sep. 30, 2011 for PCT/US2011/021359, 4 pages.
Written Opinion, mailed Jan. 14, 2013 for PCT/US2012/052009, 5 pages.
Written Opinion, mailed Feb. 27, 2013, for PCT/US2012/065476, 8 pages.
Reed et al., "Apparatus and Method for Schedule Based Operation of a Luminaire," Office Action mailed Mar. 26, 2014, for U.S. Appl. No. 13/604,327, 10 pages.
Reed et al., "Long-Range Motion Detection for Illumination Control," Amendment filed Apr. 28, 2014, for U.S. Appl. No. 12/784,080, 20 pages.
Reed, "Apparatus and Method of Energy Efficient Illumination," Notice of Allowance mailed Apr. 11, 2014, for U.S. Appl. No. 13/943,537, 9 pages.
Reed, "Apparatus and Method of Energy Efficient Illumination Using Received Signals," Office Action mailed Apr. 23, 2014, for U.S. Appl. No. 13/085,301, 12 pages.
Reed, "Electronic Control to Regulate Power for Solid-State Lighting and Methods Thereof," Office Action mailed Mar. 26, 2014, for U.S. Appl. No. 12/619,535, 16 pages.
International Search Report, mailed Feb. 26, 2014, for PCT/US2013/070794, 3 pages.
Reed et al., "Adjustable Output Solid-State Lamp With Security Features," Office Action mailed Feb. 27, 2014, for U.S. Appl. No. 13/679,687, 11 pages.
Reed et al., "Long-Range Motion Detection for Illumination Control," Office Action mailed Jan. 30, 2014, for U.S. Appl. No. 12/784,080, 26 pages.
Reed, "Ambient Light Control in Solid State Lamps and Luminaires," U.S. Appl. No. 61/933,733, filed Jan. 30, 2014, 8 pages.
Reed, "Photocontrol for Luminaire Consumes Very Low Power," U.S. Appl. No. 14/158,630, filed Jan. 17, 2014, 71 pages.
Reed, "Systems, Methods, and Apparatuses for Using a High Current Switching Device as a Logic Level Sensor," U.S. Appl. No. 61/764,395, filed Feb. 13, 2013, 48 pages.
Reed, "Systems, Methods, and Apparatuses for Using a High Current Switching Device as a Logic Level Sensor," U.S. Appl. No. 14/179,737, filed Feb. 13, 2014, 48 pages.
Written Opinion, mailed Feb. 26, 2014, for PCT/US2013/070794, 10 pages.

\* cited by examiner

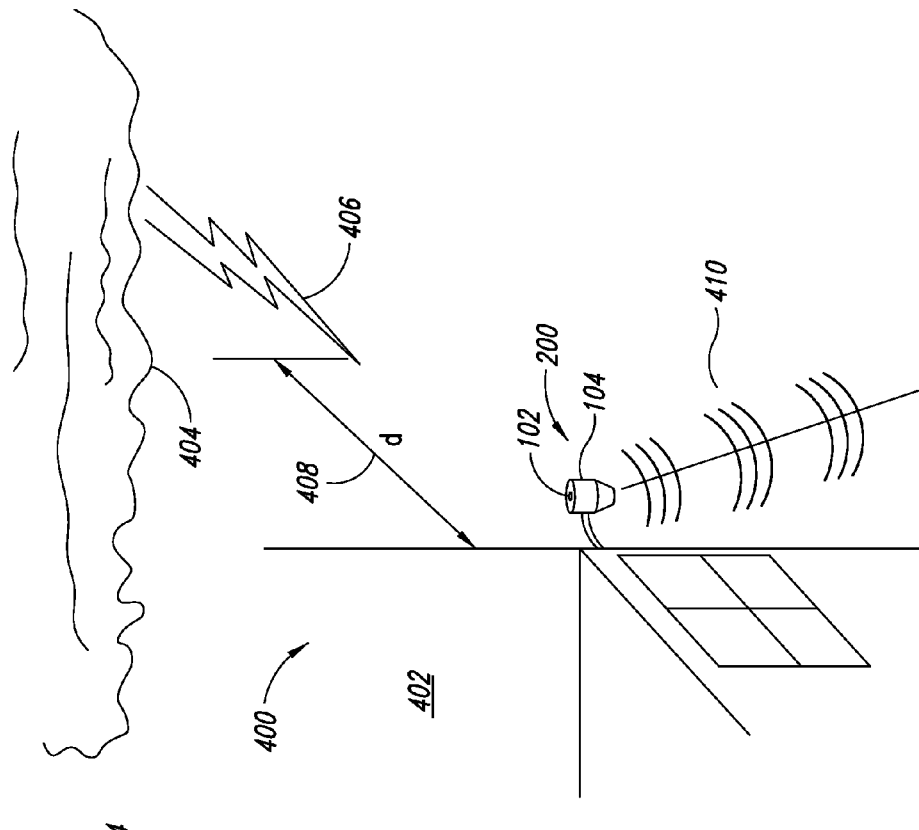
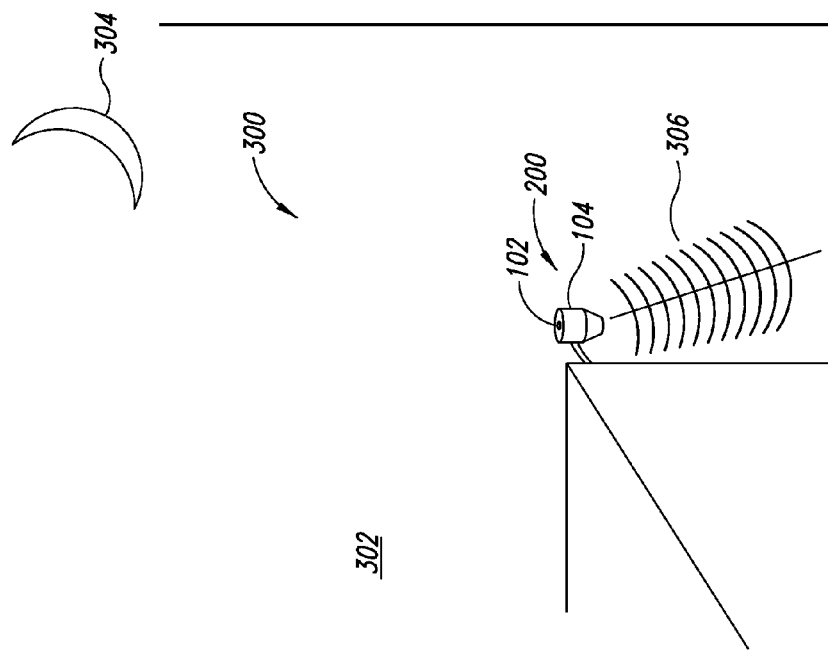

LUMINAIRE WITH ATMOSPHERIC ELECTRICAL ACTIVITY DETECTION AND VISUAL ALERT CAPABILITIES

BACKGROUND

1. Technical Field

The present disclosure generally relates to the field of illumination devices and, more particularly, to multi-purpose illumination systems having visual alert capabilities.

2. Description of the Related Art

Approximately twenty million cloud-to-ground lighting strikes occur in the United States over the course of a year. According to the National Weather Service, between the years of 1999 and 2008, lighting caused an average of 62 deaths and over 300 injuries per year in the United States. Lightning annually causes upwards of 2,000 deaths worldwide. Since atmospheric electrical activity increases during warmer weather portions of the year when people are engaged in outdoor activities, the risk posed by such atmospheric electrical activity is quite high.

Lightning can occur with or without accompanying precipitation and can travel up to 25 miles from the point of origin to the point of contact with the earth, which places even persons outside of the thunderstorm or thundershower proper at risk. Adding to the risk, except in the moments immediately preceding a strike, lightning generally provides no physical warning or sensation to those present in the path of the strike. Thus dangerous and sometimes deadly lightning strikes do occur "out of the blue" without advance warning and at a distance of miles or even tens of miles from the nearest incidence of atmospheric electrical activity.

Many municipalities, industrial, and commercial entities operate exterior lighting networks that illuminate streets, intersections, highways, parking lots and businesses during evening hours and periods of reduced visibility. To provide the most effective and efficient illumination, the individual lights within these lighting networks are usually located in exposed, highly visible locations. Historically, such lights have used mercury vapor or metal halide lamps to provide illumination. While mercury vapor and metal halide lamps have proven more robust and longer-lived than incandescent bulbs, mercury vapor and metal halide lamps require a significant warming period prior to operation and are not designed for services where rapid changes in illumination or luminous output are desired. Newer, more energy efficient lighting technologies, for example solid state lighting systems, typically do not require an extended warming period prior to operation and are much more amenable to dimming and other rapid changes in illumination.

New approaches to improving public awareness of atmospheric electrical activity using existing infrastructure networks are therefore needed.

BRIEF SUMMARY

Light sources used in the manufacture of newer, energy efficient, or "green" lamps require little or no warm-up period and as a consequence, are much more amenable to applications where sudden changes in illumination or luminous output are desired. For example, solid state light sources such as light emitting diodes, organic light emitting diodes and polymer light emitting diodes, are able to change luminous output rapidly in response to corresponding changes in input power. The ability to rapidly change output intensity in response to an input signal provides the capability for such lamps to provide a luminous output in one or more distinctive, visually recognizable, patterns. For example, the input current to one or more solid state light sources may be adjusted to produce a pulsating luminous output by the solid state light sources. Such visually distinctive luminous outputs may be generated in some instances by adjusting the frequency or pulse width of a pulse width modulated (PWM) constant current driver circuit used to power one or more solid state light sources in a luminaire. By cyclically increasing and reducing either the frequency or the pulse width of the signal provided to the one or more driver circuits powering the solid state light sources, the luminous output of the luminaire may be made to noticeably, visibly, pulse even during periods of high ambient light.

Atmospheric electrical activity detectors are able to detect the buildup of electrical charge in the atmosphere or the characteristic radio frequency emission (i.e., the electromagnetic pulse or "EMP") associated with such sudden electrical discharges in the atmosphere. Different sensors can detect other aspects of atmospheric electrical activity, including the attendant optical discharge (i.e., lightning, either cloud-to-cloud or cloud-to-ground) or audible discharge (i.e., thunder). In some instances, such electrical activity detectors can not only indicate the presence of electrical activity, but also can indicate the distance from the electrical activity. Combining the reliable, relatively low cost detection capabilities of one or more types of atmospheric electrical activity detectors with the adjustable intensity luminous output capabilities in newer or retrofitted municipal, industrial or commercial lighting networks, can provide the public with a timely notification of nearby atmospheric electrical activity, and in some instances may even provide a visual indication of the distance between a luminaire and the detected electrical activity. Such systems may advantageously provide advance warning of impending atmospheric electrical activity, enabling people caught in an exposed location such as a street, parking lot, or sports field, to seek shelter in advance of atmospheric electrical activity.

A system to visually warn of atmospheric electrical activity may be summarized as including a housing; and a control subsystem at least a portion of which is disposed at least partially within the housing, the control subsystem including: at least one atmospheric electrical activity sensor that produces a sensor signal responsive to an occurrence of atmospheric electrical activity, the sensor signal including at least one aspect representative of sensed atmospheric electrical activity; a nontransitory storage media to store at least one of machine executable instructions or data; and at least one controller communicatively coupled to the at least one atmospheric electrical activity sensor, communicatively coupled to the nontransitory storage media, and communicatively coupled to a lighting subsystem, the controller responsive to the sensor signal to selectively interrupt a first state of the lighting subsystem, in which a luminous output of the lighting subsystem is controlled responsive to at least one of a detected solar event or a scheduled solar event, with a second state.

The at least one aspect representative of sensed atmospheric electrical activity may include data indicative of a distance between the control subsystem and the sensed atmospheric electrical activity. When in the second state, the lighting subsystem may provide a visually distinguishable luminous output pattern. The luminous output pattern may include a pulsating luminous output that occurs at one or more frequencies determined by the at least one controller. The at least one controller may adjust the frequency of the pulsating luminous output in relation to a determined distance between the control subsystem and the sensed atmospheric electrical activity. When in the first state, the at least one controller may operate the lighting subsystem to provide a luminous output responsive to at least one of a scheduled sunrise event or a scheduled sunset event; wherein the nontransitory storage media includes data indicative of at least one of a current time, a current date, a current latitude of the control subsystem, or a current longitude of the control subsystem; and wherein the controller determines analytically at least one of the scheduled sunrise event or the scheduled sunset event. The control subsystem may further include a photosensitive transducer; and wherein, when in the first state, the at least one controller operates the lighting subsystem to provide a luminous output in response to an output from the photosensitive transducer that is indicative of at least one of a sensed sunrise event or a sensed sunset event. The atmospheric electrical activity sensor may include at least one electromagnetic pulse sensor. The at least one aspect of the sensor signal may include data representative of an electromagnetic pulse intensity; and wherein the controller determines a distance between the control subsystem and the atmospheric electrical activity based at least in part on the data representative of the electromagnetic pulse intensity. The atmospheric electrical activity sensor may include at least one optical sensor. The at least one aspect of the sensor signal may include data representative of atmospheric electrical optical intensity; and wherein the controller determines a distance between the control subsystem and the atmospheric electrical activity based at least in part on the data representative of the atmospheric electrical optical intensity. The atmospheric electrical activity sensor may include at least one acoustic sensor. The at least one aspect of the sensor signal may include data representative of atmospheric electrical acoustic intensity; and wherein the controller determines a distance between the control subsystem and the atmospheric electrical activity based at least in part on the data representative of the atmospheric electrical acoustic intensity. The housing may include one or more features to physically attach the housing to a stationary luminaire; and wherein the lighting subsystem is disposed at least partially in the stationary luminaire. The nontransitory storage media may further include data indicative of a number of defined thresholds, each of the number of defined thresholds associated with a respective aspect of the sensor signal. The at least one controller may maintain the lighting subsystem in the second state until at least one aspect of the sensor signal falls below the respective defined threshold. The one or more aspects may include at least one of: a frequency of occurrence of atmospheric electrical activity and a distance between the atmospheric electrical activity and the control subsystem. The control subsystem may further include at least one communications interface; wherein the controller generates at least one alert output signal at the communications interface, the at least one alert output signal including data representative of the sensed atmospheric electromagnetic activity. The lighting subsystem may include at least a driver circuit electrically coupled to one or more solid state light sources, the driver circuit having at least a pulse width modulated control signal input to vary the luminous output of the one or more solid state light sources; wherein the control subsystem generates a pulse width modulated control signal output that is communicably coupled to the driver circuit pulse width modulated control signal input; and wherein the control subsystem provides a pulse width modulated control signal output to the driver circuit pulse width modulated control signal input in either of the first state or the second state.

A method of operating a luminaire to provide a visual indication of atmospheric electrical activity may be summarized as including generating by a control subsystem one or more signals that place a lighting subsystem in a first state in which a luminous output of the lighting subsystem is controlled responsive to at least one of a detected solar event or a scheduled solar event; responsive to the occurrence of an atmospheric electrical event generating a sensor signal by at least one atmospheric electrical activity sensor, the sensor signal including data representative of at least one aspect of the atmospheric electrical event; determining by the control subsystem whether the data representative of at least one aspect of the atmospheric electrical event in the sensor signal has exceeded a respective defined threshold; and responsive to the determination that at least one aspect of the sensor signal exceeds a defined threshold, interrupting the first state and placing the lighting subsystem in a second state by the at least one control subsystem.

The method may further include generating by the lighting subsystem one or more visually distinguishable luminous output patterns while in the second state. Determining whether the data representative of at least one aspect of the atmospheric electrical event in the sensor signal has exceeded a respective defined threshold may include determining whether the at least one aspect of the sensor signal data representative of an atmospheric electrical electromagnetic pulse intensity has exceeded a defined atmospheric electrical electromagnetic pulse intensity threshold. Determining whether the data representative of at least one aspect of the atmospheric electrical event in the sensor signal has exceeded a respective defined threshold may include determining whether the at least one aspect of the sensor signal data representative of an atmospheric electrical optical intensity has exceeded a defined atmospheric electrical optical intensity threshold. Determining whether the data representative of at least one aspect of the atmospheric electrical event in the sensor signal has exceeded a respective defined threshold may include determining whether the at least one aspect of the sensor signal data representative of an atmospheric electrical acoustical intensity has exceeded a defined atmospheric electrical acoustical intensity threshold. The method may further include determining by the at least one control subsystem an approximate distance between the luminaire and the atmospheric electrical activity based at least in part on the at least one aspect of the sensor signal. Generating by the lighting subsystem one or more visually distinguishable luminous output patterns while in the second state may include generating a pulsating luminous output at a frequency when in the second state; and adjusting the frequency of the pulsating luminous output based at least in part on the determined approximate distance between the luminaire and the atmospheric electrical activity using the control subsystem. Generating one or more signals that place a lighting subsystem in a first state in which a luminous output of the lighting subsystem is controlled responsive to at least one of a detected solar event or a scheduled solar event may include determining whether at least one aspect of transducer data received by the control subsystem from one or more communicably coupled photosensitive transducers is representative of at least one of a sunrise event or a sunset event; and adjusting the luminous output of the lighting subsystem by the control subsystem in response to the at least one aspect of the transducer data representative of at least one of the sensed sunrise event or the sensed sunset event. Generating one or more signals that place a lighting subsystem in a first state in which a luminous output of the lighting subsystem is controlled responsive to at least one of a detected solar event or a scheduled solar event may include determining by the control subsystem at least one of an expected sunrise event or an expected sunset event; and adjusting the luminous output of the lighting subsystem by the control subsystem in response to the expected sunrise event or the expected sunset event.

Determining by the control subsystem at least one of an expected sunrise event or an expected sunset event may include at least one of: calculating, using one or more analytical relationships, data indicative of at least one of the expected sunrise event or the expected sunset event using at least one of a current time, a current date, or a current location of the luminaire; or retrieving from one or more data tables stored in a nontransitory storage media communicably coupled to the control subsystem data indicative of at least one of the expected sunrise event or the expected sunset event.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 3 is a perspective view showing a luminaire with a control subsystem such as described in FIG. 1 in a first state to provide visible lighting in the absence of nearby electrical activity, according to one non-limiting illustrated embodiment.

FIG. 4 is a perspective view showing a luminaire with a control subsystem such as described in FIG. 1 operating in a second state to provide a visual indication of nearby atmospheric electrical activity, according to one non-limiting illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known or well-documented solar or astronomical relationships such as the "sunrise equation" and structures associated with luminaires, electrostatic pulse detectors, timing circuits, real time clock circuits, data look-up tables, and the like have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Additionally, the terms "lighting" and "illumination" are used herein interchangeably. For instance, the phrases "level of illumination" or "level of light output" have the same meanings. Also, for instance, the phrases "illumination source" and "light source" have the same meanings.

The headings and Abstract of the Disclosure provided herein are for convenience only and do not interpret the scope or meaning of the embodiments.

Figure 1:
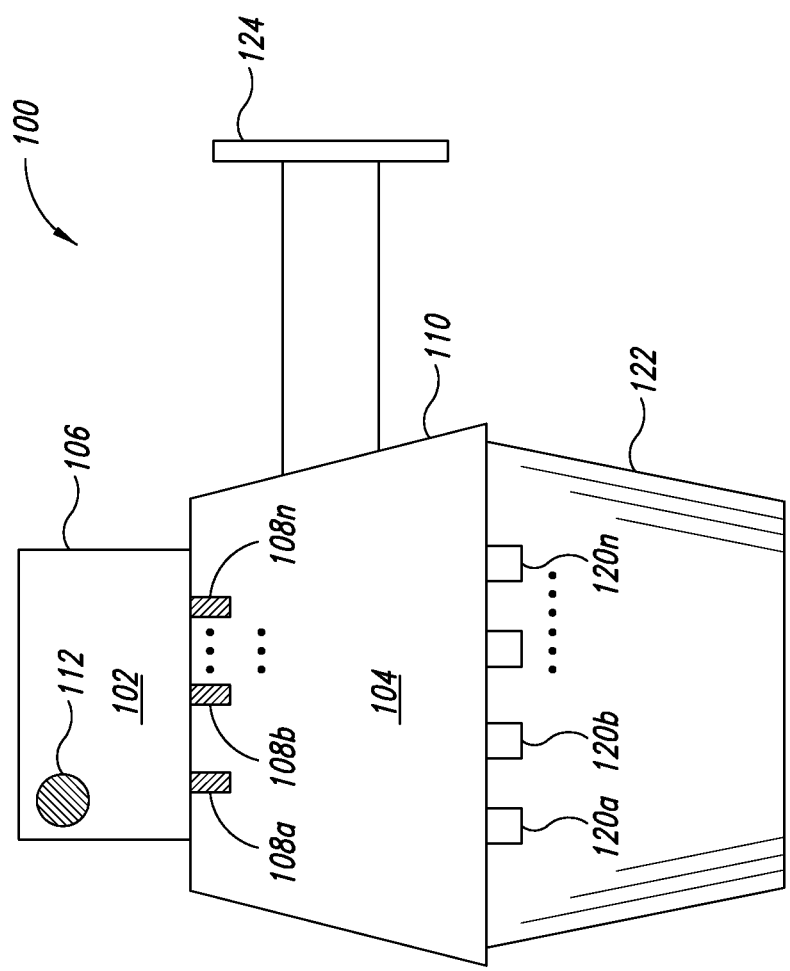
FIG. 1 is an elevation view showing a luminaire including a control subsystem physically attached and electrically coupled to a lighting subsystem, according to one non-limiting illustrated embodiment.

FIG. 1 shows an illustrative luminaire 100 including a control subsystem 102 disposed within a housing 106 that is physically and electrically coupled to a lighting subsystem 104 via one or more circuits 108a-b (collectively 108). The lighting subsystem 104 can be at least partially disposed in a luminaire housing 110. One or more light sources 120a-n (collectively 120) can be partially or completely surrounded by the luminaire housing 110. In at least some instances, all or a portion light provided of the one or more light sources 120 may pass through a lens, diffuser or similar shade 122 attached to the luminaire housing 110 when exiting the luminaire 100.

Although the control subsystem 102 and the lighting subsystem 104 are depicted as physically attached using a plug type electrical coupling circuit 108 in FIG. 1, at times the control subsystem 102 may be disposed in a location remote from the lighting subsystem 104. For example, the control subsystem 102 may be at least partially disposed within a housing 106 that is mounted on an exterior surface of a structure and the lighting subsystem 104 may be mounted inside the structure. When the control subsystem 102 is remote mounted, one or more wired or wireless connections may be used to power the control subsystem 102 and to communicably couple the control subsystem 102 with the lighting subsystem 104. The luminaire 100 can include one or more brackets 124 that permit the luminaire 102 to be suspended from or otherwise supported by a rigid structure such as that provided by a pole or building. The shade 122 may be transparent, translucent, or opaque.

The luminaire 100 may include wiring (not shown in FIG. 1) to supply power to the control subsystem 102 and the lighting subsystem 104 using an external electrical power source such as an electrical power grid. In some instances, the one or more light sources 120 may be formed into a replaceable component, for example a plurality of individual solid state light sources or solid state light source strings formed into a bulb or similar unitary structure that physically attaches and electrically couples to the lighting subsystem 104 using a threaded, plug, or bayonet-type socket mount. Alternatively, the one or more light sources 120 may be integral with the lighting subsystem 104, particularly where the lighting subsystem 104 includes a plurality of solid-state light emitters and associated driver circuit hardware which have a relatively long operational life.

The control subsystem 102 includes electrical circuitry or electronics that control or otherwise alter or adjust the power, luminosity, luminous output, or illumination state of the lighting subsystem 104, or control one or more functions of the luminaire 100. Such functions may include, but are not limited to placing the lighting subsystem 104 in a first state where the luminous output of the one or more light sources 120 are adjusted or otherwise controlled in response to the detected or expected occurrence of or more solar events. For example, the first state may include increasing the output level of the light sources 120 from 0% luminous output to a level between 10% and 100% luminous output after the occurrence of a detected or expected sunset event and decreasing the output level of the light sources 120 from a level between 10% and 100% luminous output to 0% luminous output after the occurrence of a detected or expected sunrise event.

Such functions may additionally include placing the lighting subsystem 104 in a second state where the output intensity of the one or more light sources 120 are adjusted or otherwise controlled by the control subsystem 102 in response to the detection of an atmospheric electrical event such as a cloud-to-cloud or a cloud-to-ground lightning strike. In some instances, the control subsystem 102 may place the lighting subsystem 104 in the second state in response to the detection of an atmospheric electrical event occurring at a distance less than a defined distance threshold from the control subsystem 102. For example, upon detecting an a cloud-to-ground lighting strike within 10 miles of the control subsystem 102, the control subsystem 102 may place the lighting subsystem 104 in a second state that causes the one or more light sources 120 to provide a visually distinctive luminous output indicating the presence of nearby atmospheric electrical activity.

The housing 106 can include any structure suitable for internally and/or externally accommodating all or a portion of the control subsystem 102. At times, the housing may be a metallic weatherproof enclosure (e.g., a National Electrical Manufacturers Association "NEMA" type 3, 3R, or 4 enclosure) or a corrosion resistant weatherproof enclosure (e.g., a NEMA 4X enclosure). At least a portion of the housing 106 may be substantially transparent to radio frequency (RF) or optical electromagnetic radiation. The housing 106 may include one or more features, such as one or more threaded fasteners, plugs, hooks and loops, or combinations thereof to facilitate the mechanical or physical attachment of the housing 106 to a luminaire housing 110 or other structure. In some instances, the electrical coupling circuit 108 can include a number of electrical contacts such as pads, prongs, spades, protrusions, or similar electrically conductive structures on at least a portion of the exterior surface of the housing. Such surface mount electrical connectors are particularly advantageous where the control subsystem 102 is fitted directly to the luminaire housing 110 during manufacture or where the control subsystem 102 is retrofitted to an existing luminaire housing 110 after installation. In other instances, the electrical coupling circuit 108 can include a number of cables, each having a number of conductors extending from the housing 106. Such remote mount electrical connectors are particularly useful where the control subsystem 102 is mounted in the field at a distance from the luminaire housing 110.

As described in greater detail below, when in the first state the control subsystem 102 may advantageously use one or more timers, timing circuits, or real time clocks to look-up or calculate the expected time of occurrence of one or more scheduled solar events and adjust the luminous output or intensity of the luminaire 100. At times, such timing circuits may also be used by the control subsystem 102 in assessing the relative overall level severity of nearby atmospheric electrical activity, for example by detecting the number of lightning strikes occurring in a defined time period (e.g., strikes per minute). Such timing circuits may also be used by the control subsystem 102 in assessing when the risk posed by atmospheric electrical activity has dropped to an acceptable level and when to return the lighting subsystem to the first state (e.g., place lighting subsystem 104 into the first state after no measurable atmospheric electrical activity for a defined period). In at least some instances, such timing circuits may additionally be used to determine the distance between the control subsystem 102 and the atmospheric electrical activity, for example by measuring the duration between the receipt of an optical signal associated with a lightning event and the receipt of an acoustic signal associated with the respective lightning event.

Also as described in greater detail below, the control subsystem 102 may advantageously use one or more atmospheric electrical activity sensors to initiate a second state providing visually distinctive luminous output from the light sources 120 upon detection of nearby atmospheric electrical activity. In some instances, the second state may be executed in parallel with the first state. In other instances, the second state may interrupt all or a portion of the first state. For example, when the lighting subsystem 104 is placed in the second state, the control subsystem 102 may continue to execute instructions related to solar event timekeeping or similar administrative functions associated with the first state.

Certain example first states include calculating or looking up an expected time of occurrence for a sunset event. The first state may include increasing the luminous output of the lighting subsystem 104 from 0% (no luminous output) to 100% (full luminous output) at the expected time of occurrence of the sunset. Alternatively, the first state may include incrementally increasing the luminous output of the lighting subsystem 104 from 0% (no luminous output) to 100% (full luminous output) in increments (e.g., 5%) starting a defined period (e.g., 10 minutes) prior the expected time of occurrence of the sunset event and extending a defined period (e.g., 10 minutes) subsequent the expected time of occurrence of the sunset event.

In at least some instances, the time of occurrence of various solar events (e.g., a sunrise event, a sunset event, a solar noon event, a solar midnight event, a dusk event, a dawn event) can be determined using one or more lookup tables or other data structures containing data indicative of the times of occurrence for various solar events and stored in a nontransitory storage media accessible by the control subsystem 102. The time of occurrence of various solar events may additionally or alternatively be calculated using geolocation, time, or date data either generated by or stored within the control subsystem 102 or obtained from one or more external devices via one or more wired or wireless communication interfaces either in or communicably coupled to the control subsystem 102. In some instances, one or more photosensitive transducers may be used to detect via ambient light measurement the occurrence of one or more solar events including a detected sunrise event and a detected sunset event used to control the luminous output of the lighting subsystem 104 in the first state.

The one or more light sources 120 may take a variety of forms. The light source may include one or more distinct light bulbs, lights or light emitters 120a-120n (only four called out in FIG. 1). For example, the one or more light sources 120 may take the form of one or more incandescent light bulbs, one or more florescent light bulbs, HID light bulbs or lights, or one or more arc lamps. More preferably, the one or more light sources 120 may take the form of one or more solid state light sources, for instance an array of light emitting diodes (LEDs), organic light emitting diodes (OLEDs), or polymer light emitting diodes (PLEDs). The one or more light sources 120 do not necessarily have to be enclosed in a bulb structure. For example, the light sources may take the form of one-, two-, or even three-dimensional arrays of individual LEDs or strings of LEDs.

Light source configurations other than the individual luminaire shown in FIG. 1 may be used to equal effect. For example, the luminaire may include a plurality of directional light sources 120 mounted on a common base and operated using a common control subsystem 102. In another example, a plurality of luminaires 100 may be networked (i.e., communicably coupled) together and the luminous output of each of luminaires 100 in the network controlled as a group using a single control subsystem 102.

Figure 2:
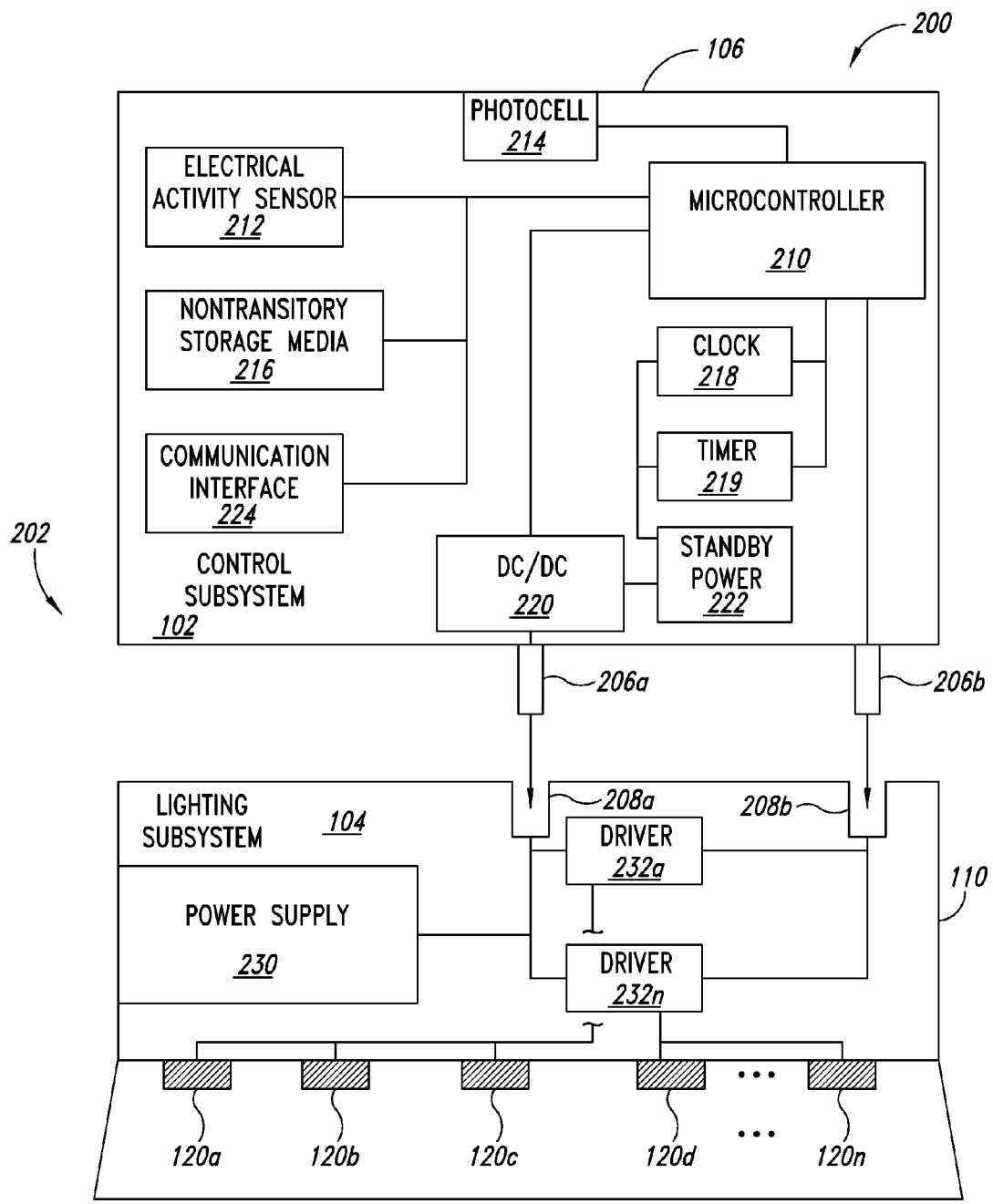
FIG. 2 is a schematic diagram showing a luminaire including a control subsystem and a lighting subsystem, according to one non-limiting illustrated embodiment.

FIG. 2 shows an illumination system 200 including a luminaire 202 with a control subsystem 102 communicably coupled to a lighting subsystem 104 via one or more plugs 206a-206b on the control subsystem 102 and one or more complimentary receptacles 208a-208b on the lighting subsystem 104, according to one non-limiting illustrated embodiments. The illumination system 200 may be identical or similar to the illumination system 100 (FIG. 1) or may have a physical configuration that differs in form but is similar in function to the illumination system 100 illustrated in FIG. 1. The illumination system 200 may employ any number light sources 120. In some instances, the illumination system 200 may include more than one luminaire 202.

The illumination system 200 includes the control subsystem 102 which may be a separate component that can be added post-manufacture, for instance in the form of a retrofit kit, to the luminaire 202 (e.g., by "plugging in" a modular control subsystem 102 as shown in FIG. 2) or may be integral to the luminaire 202 (e.g., a control subsystem 102 that is hardwired to the lighting subsystem 104 as shown in FIG. 1). Notably, the control subsystem 102 includes at least one microcontroller 210 and at least one electrical activity sensor 212 other sensors such as a photosensitive transducer 214 to sense the varying levels (e.g., power or intensity) of one or more light conditions in the ambient environment about the luminaire 202 may be optionally communicably coupled to the microcontroller 210. The at least one microcontroller 210 may be used to place the lighting subsystem 104 in at least a first state and/or a second state. The control subsystem 102 may further control one or more operational aspects of the lighting subsystem 104 in each of the first and the second states.

One or more aspects of the lighting subsystem 104 may be controlled at least in part by the microcontroller 210 based on the detected occurrence of one or more solar events sensed by the photosensitive transducer 214 when in the first state. At other times, the lighting subsystem 104 may be controlled at least in part by the microcontroller 210 based on the expected occurrence of one or more solar events. At such times, the control subsystem 102 may calculate, retrieve, or otherwise determine the expected time of occurrence of a solar event using current time data, current date data, geolocation data and one or more analytical relationships.

One or more aspects of the lighting subsystem 104 may additionally be controlled by the microcontroller 210 at least in part based on the occurrence of one or more atmospheric electrical events sensed by the at least one electrical activity sensor 212. For example, upon detection of an atmospheric electrical event such as a cloud-to-ground lightning strike, the at least one microcontroller 210 may place the lighting subsystem 104 in a second state (e.g., an alert state that warns of nearby atmospheric electrical activity). In some instances, the first and the second states can occur contemporaneously or simultaneously, with the luminous output of the lighting subsystem 104 determined by the second state. In other instances, the second state may interrupt at least a portion of the first state. When in the second state, the at least one microcontroller 210 can cause the lighting subsystem 104 to provide a luminous output in a visually distinctive pattern to alert nearby individuals of the risk posed by the atmospheric electrical activity sensed by the at least one electrical activity sensor 212.

The at least one microcontroller 210 may take any of a variety of forms, for example a microprocessor, programmable gate array (PGA), application specific integrated circuit (ASIC), digital signal processor (DSP), etc. The at least one microcontroller 210 may require very limited computing power, for example an 8-bit microcontroller may be sufficient. The at least one microcontroller 210 may be communicatively coupled to receive signals directly from the at least one atmospheric electrical activity sensor 212. In some instances, the at least one microcontroller 210 can include internal nontransitory storage media. Where provided, the photosensitive transducer 214 may be directly or indirectly communicably coupled to the at least one microcontroller 210.

In some instances, a single microcontroller 210 controls a plurality of wiredly or wirelessly networked luminaires 202 within the illumination system 200. In such instances, the luminaires 202 in the network may be addressed and/or controlled individually, addressed and/or controlled as a plurality of sub-networks, or addressed and/or controlled as a single network. In such an arrangement, the single microcontroller 210 may transmit various signals exercising control over operation of the luminaires 202 comprising the network.

The control subsystem 102 may optionally include nontransitory storage media 216. In at least some instances, at least a portion of the nontransitory storage media 216 may wholly or partially comprise removable storage media such as secure digital (SD) or compact flash (CF) cards, universal serial bus (USB) memory sticks, or similar. The non-removable portion of the nontransitory storage media 216 may take any of a variety of forms, for example electrically erasable programmable read only memory (EEPROM), flash memory, solid state memory, memristor memory, atomic memory, or combinations thereof. The nontransitory storage media 216 may have sufficient capacity to store or otherwise retain one or more sets of machine executable instructions, year-long daily sunrise and sunset times at a number of latitudes, open storage for acquired data indicative of one or more solar events including data either internally generated by the control subsystem 102 or acquired from one or more external sources such as a network or handheld computing device. In some instances, the control subsystem 102 may automatically overwrite all or a portion of the data stored within the nontransitory storage media 216, for example every number N of daily cycles.

In at least some instances, the at least one nontransitory storage media 216 can store or otherwise retain a number of look-up tables or other data structures containing astronomical or solar event data. Such astronomical or solar event data may include sunrise and sunset times, dusk and dawn times, solar noon and solar midnight times, and the like. In at least some instances, the at least one nontransitory storage media 216 can store or contain geolocation information specific to the position or location or the intended position or location of the luminaire 206 on the surface of the Earth. Such geolocation data can include at least the latitude or other similar positioning information or coordinates sufficient to identify the location or intended location of the luminaire 202 with respect to a pole or the equator or any similar fixed geographic reference point on the surface of the Earth. In some implementations the geolocation data may include the longitude in addition to the latitude. Longitude data may be useful, for example in identifying a particular time zone (e.g., a time zone location referenced to a reference time or time zone such as coordinated universal time, UTC) in which the luminaire 202 is operating or programmed to operate. In some instances, dates and times corresponding to the conversion from daylight savings time to standard time (and vice-versa) may be stored within the nontransitory storage media 216 to permit the scheduled operation of the luminaire 202 to reflect such legislative time changes. Such geolocation, reference time, time zone, and daylight savings time data may be communicated to and stored in the nontransitory storage media 216, for example, using a portable handheld electronic device having global positioning capabilities and a communications link (wired or wireless, including RF, microwave or optical such as infrared) to the luminaire 212. Alternatively, geolocation, reference time, time zone, or daylight savings time information may be stored in a read-only portion of the at least one nontransitory storage media 216, for example when the luminaire 202 is manufactured, installed, commissioned, programmed or serviced.

Data representative of one or more defined thresholds associated with one or more aspects of atmospheric electrical activity may be stored wholly or partially within the nontransitory storage media 216. For example, data representative of one or more defined thresholds indicating varying levels of electromagnetic pulse strength, electromagnetic pulse distance, or other electromagnetic characteristics associated with atmospheric electrical activity may be stored in the nontransitory storage media 216. Data representative of one or more defined thresholds indicating varying levels of optical signal strength, optical signal distance, or other optical characteristics associated with atmospheric electrical activity may be stored in the nontransitory storage media 216. Data representative of one or more defined thresholds indicating varying levels of acoustic signal strength, acoustic signal distance, or other acoustic characteristics associated with atmospheric electrical activity may be stored in the nontransitory storage media 216.

The control subsystem 102 may include one or more integrated or discrete real time clock circuits 218. For example, a real time clock implemented on integrated circuit such as the PCF2129A as manufactured by NXP Semiconductors (Eindhoven, The Netherlands) may be used in some instances. In at least some instances, the real time clock circuit 218 may be persistently powered, for example using one or more batteries, capacitors, ultracapacitors or similar energy storage devices 222. Other commercially available semiconductor chips providing real time clock functionality may be equally employed. The control subsystem 102 may implement a real time clock based on timing signals produced by the microcontroller 210, processor clock, or another oscillator. The control subsystem 102 may include a timer circuit 219 (e.g., a digital timing circuit or an analog timer circuit). In at least some instances, the timer circuit 219 may be persistently powered, for example using one or more batteries, capacitors, ultracapacitors or similar energy storage devices 222. The timer circuit 219 may produce control signals at defined periods following an occurrence of defined times as indicated by the real-time clock circuit 218 of the control subsystem 102.

As explained in detail below with reference to FIGS. 3-5, the at least one microcontroller 210 may be used to control one or more aspects of the operation of the lighting subsystem 104. The at least one microcontroller 210 can place the lighting subsystem in a first state where the luminous output of the lighting subsystem 104 is controlled or adjusted based at least in part on the detected or expected occurrence one or more solar events. In one example, the luminous output of the lighting subsystem 104 may be increased to 100% at a time corresponding to a detected or expected time of occurrence of a sunset event and decreased to 0% at a time corresponding to a detected or expected time of occurrence of a sunrise event. The first state may be maintained by the control subsystem 102 as a persistent, continuous, or default program that controls the luminous output of the lighting subsystem 104 in the absence of sensed atmospheric electrical activity. Instructions for the first state may be rendered as one or more machine executable instruction sets and stored at least partially within a non-volatile portion of the nontransitory storage media 216.

In some instances, when in the first state the luminous output of the lighting subsystem 104 may be controlled or otherwise adjusted by the at least one microcontroller 210 based at least in part on a sensed ambient light level indicative of the detected time of occurrence of one or more solar events such as a sunrise event or a sunset event. The ambient light level may be sensed by the photosensitive transducer 214 or any other system or device communicably coupled to the at least one microcontroller 210 that is capable of providing at least one signal including data indicative of a sensed ambient light level. The at least one signal can be transmitted from the photosensitive transducer 214 directly or indirectly to the at least one microcontroller 210. In at least some instances, the first state may cause the at least one controller 210 to compare the data indicative of the ambient light level in the signal from the photosensitive transducer 214 with data indicative of one or more defined ambient light thresholds to determine whether to illuminate the light sources 120, determine the luminous output of the light sources 120, or both. The data indicative of the one or more defined ambient light thresholds may be stored or otherwise retained in the at least one microcontroller 210, the nontransitory storage 216, or combinations thereof.

The occurrence of solar events is cyclical and predictable using one or more algorithms (e.g., the "sunrise equation") or tabularized data (e.g., sunrise and sunset or similar astronomical tables). Generally, when provided local geolocation and date information, the expected sunrise time and the expected sunset time may be either calculated or retrieved from a data store. In at least some instances data indicative of luminaire geolocation, current time, and current date may be accessed by the at least one microcontroller 210 using one or more internal sources (e.g., nontransitory storage 216, real time clock 218, timer circuit 219, etc.), one or more external sources (e.g., a network connection or connection to a remote electronic device, etc.), or any combination thereof. By comparing current time data provided by a real time clock 218 or timer circuit 219, the at least one microcontroller 210 can control or otherwise adjust the luminous output of the light sources 120 based at least in part on the expected time of occurrence of one or more solar events.

Thus, in other instances the at least one microcontroller 210 may employ a lookup table or other data structure containing data indicative of the scheduled, predicted or expected times of occurrence of one or more solar events. In yet other instances, the at least one microcontroller 210 may calculate the expected time of occurrence of one or more solar events using one or more equations, algorithms, relationships or correlations based at least in part on the latitude at which the luminaire 202 operates or is programmed to operate, the current date, the day in the solar cycle (e.g., day 106 of a 365¼ day cycle), or the Julian date.

In the second state the at least one microcontroller 210 controls the luminous output of the lighting subsystem 104 based on one or more sensed aspects of an atmospheric electrical event (e.g., occurrence of cloud-to-ground or cloud-to-cloud lighting events). Atmospheric electrical events may be sensed using one or more electrical activity sensors 212. The one or more electrical activity sensors 212 can provide a sensor output signal containing data representative of at least one aspect of the sensed atmospheric electrical event. The at least one aspect may include data indicative of the strength of the atmospheric electrical event, the distance of the atmospheric electrical event from the one or more electrical activity sensors 212, the frequency of occurrence of the atmospheric electrical event, or combinations thereof. The one or more electrical activity sensors 212 can generate data representative of the electromagnetic pulse strength associated with the atmospheric electrical activity, the optical intensity associated with the atmospheric electrical activity, the acoustic intensity associated with the atmospheric electrical activity, or any combination thereof. The sensor output signal can be provided as one or more inputs to the at least one microcontroller 210.

The at least one microcontroller 210 compares at least one aspect of the sensor output signal received from the electrical activity sensor 212 to one or more defined threshold values. In at least some instances, the one or more defined threshold values may be representative of atmospheric electrical activity having a strength, distance, or frequency capable of posing a threat to individuals proximate the luminaire 200. The one or more defined threshold values may be stored within the microcontroller 210 either in the form of "hardwired" values or stored as data within either or both the nontransitory storage media internal to the microcontroller 210 or in the a nontransitory storage media 216.

When the microcontroller 210 detects a sensor output signal having at least one aspect exceeding the respective defined threshold value, the microcontroller 210 can place the lighting subsystem 104 in a second state. The second state may advantageously warn individuals proximate the luminaire 200 of the potentially dangerous atmospheric electrical activity. Such a warning can take the form of one or more unique or distinctive luminous output patterns generated by the lighting subsystem 104. Where two or more luminaires 200 are wiredly or wirelessly networked, all or a portion of the networked luminaires 200 may also be placed in the second state thereby advantageously forming neighborhood, local, or regional warning networks. Given the placement of luminaires 200 in public locations, such network based warning systems may advantageously provide an alert to a broad segment of the population without requiring the use of one or more personal electronic devices (e.g., turning on a radio or television to receive an emergency broadcast).

In response to a detected atmospheric electrical event, the microcontroller 210 can, in some instances, place the lighting subsystem 104 in the second state by selectively interrupting the current supplied to the lighting subsystem 104. Such interruptions may be accomplished by physically disrupting the current flow to all or a portion of the light sources 120, for example using one or more electromechanical switches such as a relay, one or more solid state switches such as one or more triacs, or any combination thereof. Such interruptions may also be accomplished by electrically for example by reducing the power transferred to the light sources 120, such as by reducing to approximately zero the pulse width or pulse frequency of a pulse width modulated current supplied to the light sources 120.

In at least some instances, while in the second state the at least one microcontroller 210 may continue to execute one or more machine executable instructions associated with the first state, for example to keep track of the expected time of occurrence of one or more solar events. However, while in the second state, the luminous output of the lighting subsystem 104 is determined by the at least one microcontroller 210 based at least in part on the detected atmospheric electrical activity. When no atmospheric electrical activity is sensed for a defined period of time or when the frequency of the atmospheric electrical activity (e.g., number of cloud-to-ground lightning strikes detected in a 10 minute time period falls below a defined threshold, etc.), the at least one microcontroller 210 can interrupt or abort the second state and return to the first state. The second state may also be rendered as one or more machine executable instruction sets stored at least partially within the nontransitory storage media 216 and executed by the one or more processors 210.

The control subsystem 102 may include a power converter 220 that rectifies, steps down a voltage or otherwise conditions electrical power supplied to the at least one microcontroller 210, the nontransitory storage media 216 and/or other components of the control subsystem 102. In one instance, the power converter 220 may include an AC/DC converter used to step a voltage down to a first level suitable for the control electronics of the control subsystem 102. An example of such an AC/DC converter is a "capacitor dropping" type AC/DC converter including a moderately sized capacitor (e.g., 1 microfarad capacitor) and a rectifier or bridge rectifier including a capacitor and a half- or full-bridge rectifier.

The control subsystem 102 can include one or more energy storage devices 222 (e.g., battery cells, button cells, capacitors, super- or ultracapacitors, fuel cell), used to supply power to the components of the control subsystem 102 when needed, for example in the event of loss of power from the grid or other external power source. For example, the one or more energy storage devices 222 may supply power to the real time clock circuit 218 or the timer circuit 219 in instances where electrical power supplied by an electrical distribution grid or network is interrupted. The one or more energy storage devices 222 may also provide sufficient power to maintain the current date, day in the solar cycle, or Julian date and the current time within the real time clock 218 during the luminaire manufacturing, shipping and installation process. In at least some instances, the current time can include a local time (i.e. the time in the time zone in which the luminaire is operating or intended to operate) or a universal time such as coordinated universal time (UTC). Where a universal time is used, one or more correction factors useful in converting the universal time to a local time in which the luminaire is operating or intended to operate may be stored in the nontransitory storage media 216.

In some instances, the current time and current date may be the local time and the local date at the geographic location where the luminaire is installed or is intended for installation. Such local time and local date information may be stored within the nontransitory storage media 216 along with any local time changes (e.g., Daylight Savings time changeover dates and times), leap years, or other events affecting the local time or local date. Such current time/current date or local time/local date information may be periodically or continuously provided to or updated in the luminaire using one or more external electronic devices. For example, the current or local time or date may be periodically updated using an electronic device connected via a wired or wireless network, or a portable electronic device such as a cellular telephone, portable data assistant, tablet computer, or the like.

One or more optional wired or wireless communications interfaces 224 may be disposed within the control subsystem 102. Such communications interfaces 224 may include, but are not limited to one or more optical (e.g., infrared), wired (e.g., IEEE 802.3, Ethernet, etc.) or wireless (e.g., IEEE 802.11—WiFi®; cellular—GSM, GPRS, CDMA, EV-DO, EDGE, 3G, 4G; Bluetooth®; ZigBee®; Near Field Communications; etc.) communication interfaces. The one or more communication interfaces 224 may be communicably coupled to the at least one microcontroller 210 or the at least one nontransitory storage media 216 and used to bidirectionally exchange data between the control subsystem 102 and one or more external electronic devices, systems, or networks. In some instances, the one or more communication interfaces 224 may provide the control subsystem 102 in a first luminaire 202 with the ability to unidirectionally or bidirectionally communicate with the control subsystem 102 in a number of other luminaires 202 forming the illumination system 200.

The one or more wired or wireless communications interfaces 224 facilitate the transfer of data indicative of a current time, a universal time (e.g., Coordinated Universal Time, UTC), a current date, a current day of the solar cycle (e.g., day 213 of a 365¼ solar cycle), a Julian date, or combinations thereof. The one or more wired or wireless communications interfaces 224 may facilitate the transfer of data indicative of one or more sets of machine executable instructions used by the microcontroller 210. The one or more wired or wireless communications interfaces 224 may facilitate the transfer of data indicative of one or more sets of operational code such as firmware useful in supporting the operation of the control subsystem 102.

The lighting subsystem 104 includes one or more light sources 120 powered using a power supply 230 and a number of driver circuits 232a-232n (two of which are shown in FIG. 2). Each of the one or more light sources 120 can include a single light source or one or more strings of electrically coupled light sources 120. The light sources 120 can include any type of light source that is able to respond to fluctuations in input power to provide a plurality of light levels. In at least some instances, each of the light sources 120 may advantageously include one or more solid state light sources such as LEDs, OLEDs, PLEDs, and the like. All or a portion of the number of light sources 120 may be selectively replaceable, removable, or interchangeable from the lighting subsystem 104. The lighting subsystem 104 may be selectively removable or interchangeable from the luminaire 202. Alternatively, the light sources 120 and all or a portion of the lighting subsystem 104 may be an integral part of the luminaire 202. Various examples of suitable light sources 120 are described above.

The power supply 230 may include one or more rectifiers, DC/DC converters, isolation transformers, filters, smoothing capacitors, etc. to rectify, step a voltage and otherwise transform or condition electrical power from an external source into a form suitable to power the components of the control subsystem 102 or lighting subsystem 104. In some instances, the power supply 230 can supply rectified DC voltage to the power converter 220 which, in turn, supplies regulated DC voltage to all or a portion of the control subsystem 102. In some instances, power flow from the power supply 230 may flow through one or more switches or similar circuit interrupters capable of disrupting current or power flow to all or a portion of the light sources 120. In at least some instances, the microcontroller 210 can open, close, or otherwise control the operation of the one or more switches or similar circuit interrupters to create a visually distinct luminous output when in the second state.

The lighting subsystem 104 may employ any number of power controllers, switches, or other systems or devices configured to turn the light sources 1200N and OFF and/or to adjust the luminous output or luminosity of the light sources 120. In some situations, the power controllers may employ various switches, for example contact switches, relays, solid state switches, transistors, triacs or the like to control the flow of current or power to the number of light sources 120. In other situations, the number of power controllers may include one or more switched devices or systems, such as a switched mode power supply 230 or power converter, the output of which can be controlled or adjusted based on at least one output signal provided by the microcontroller 210. In some instances, the number of light sources 120 can include one or more solid state light sources and the microcontroller 210 can provide one or more pulse width modulated (PWM) output signals to the power supply 230, all or a portion of the number of driver circuits 232, or both. In at least some instances, the luminous output of the solid state light sources 120 may be adjusted by controlling the duty cycle of the solid state light sources 120. For example, the overall duty cycle (and consequent luminous output) of the solid state light sources 120 may be adjusted by the control subsystem 102 by increasing or decreasing at least one of a PWM signal pulse width or frequency of the output signal provided by the microcontroller 210 to the power supply 230 or the driver circuits 232.

The power supply 230 may also supply rectified DC voltage directly to one or more driver circuits 232. In at least some instances, the driver circuits 232 can convert the input voltage to a constant current having parameters matched to the type of LEDs used to provide the light sources 120. A DC/DC converter (e.g., a DC/DC buck converter) may be used to power all or a portion of the driver circuits 232 powering the light sources 120. In addition, in some instances, the control subsystem 102 can provide a control input to at least a portion of the driver circuits 232. Such driver circuit control inputs can enable a power ON or a power OFF to the light sources 120, provide for the gradual or rapid dimming or brightening an output from the light sources 120, or various combinations thereof. For example, the control input provided by the at least one microcontroller 210 to the driver circuits 232 may be a pulse width modulation (PWM) signal sufficient to cause the driver circuits 232 to supply the constant current to the light sources 120 for a first period of time and to not supply the constant current to the light sources 120 for a second period of time.

In at least one embodiment, an AC/DC switched-mode power converter having digital input capabilities may be used to provide all or a portion of the power to the light sources 120. In such instances, the control signal provided by the microcontroller 210 may be used to selectively control the operation of the AC/DC switched mode converter. For example, an IRS2548D SMPS/LED Driver PFC+Half-Bridge Control IC as manufactured by International Rectifier Corp. (Los Angeles, Calif.) may be used to control the flow of power to the light sources 120 using the output signal from the microcontroller 210. In such instances, the presence of a low output signal (e.g., a digital "0" signal) from the microcontroller 210 may permit the flow of current to the light sources 120 while the presence of a high output signal (e.g., a digital "1" signal) from the microcontroller 210 may inhibit the flow of current to the light sources 120.

As used herein and in the claims, adjusting an illumination level includes turning ON a light source from an OFF state in which no light or illumination is produced to an ON state at which at least some light or illumination is produced. As used herein and in the claims, adjusting an illumination level includes turning OFF a light source from an ON state in which at least some light or illumination is produced to an OFF state at which no light or illumination is produced.

As used herein and in the claims, adjusting an illumination level also includes increasing and/or decreasing a level of light or illumination produced. Such may include adjusting an output level for any given discrete light source. Such may additionally or alternatively include adjusting a total number of light sources that are in the ON state. For example, a first and second set or strings of light sources may be used to produce a first level of light or illumination, while only the first set or string of light sources may be used to produce a second level of light or illumination. Also for example, a first number of light sources in a first set or string may be used to produce the first level of light or illumination, while a smaller number or subset of light sources in the first set or string may be used to produce the second level of light or illumination.

FIG. 3 shows an environment 300 in which a luminaire 200 is installed such as those described in FIGS. 1 and 2 and operating in a first state, according to one or more embodiments. In the first state, the lighting subsystem 104 is controlled or otherwise adjusted by the control subsystem 102 to provide illumination based at least in part on one or more detected or expected solar events. As shown in FIG. 3, in some instances, the luminaire 200 may provide illumination at one or more output intensity levels between a detected or expected sunset event and a detected or expected sunrise event.

In the absence of atmospheric electrical activity, the luminaire 200 can provide illumination at continuous or varying levels 306. For example, a luminaire 200 in a parking lot may provide a 100% output intensity after a detected or expected sunset event and 0% output intensity after a detected or expected sunrise event. Such illumination at a continuous level 306 may be advantageously used in street lighting applications, illumination of commercial establishments during non-business hours to deter theft and crime, and illumination in industrial facilities during evening shifts. As discussed in detail with regard to FIG. 2, when in the first state, the luminous output of the lighting subsystem 104 may be controlled by the control subsystem 102 using at least one photosensitive transducer 214 to detect ambient lighting conditions indicative of one or more solar events or using one or more methods of calculating or retrieving an expected time of occurrence of one or more solar events.

FIG. 4 shows an environment 400 in which a luminaire 200 is installed, such as that described in FIGS. 1 and 2 and operating in a second state, according to one or more embodiments. The tumultuous atmosphere 402 in FIG. 4 includes storm clouds 404 and atmospheric electrical activity in the form of lightning 406 occurring at a distance 408 from the luminaire 200. In response to detection of lightning 406, the lighting subsystem 104 is placed into a second mode in which the luminous output of the lighting subsystem 104 is controlled or otherwise adjusted by the control subsystem 102 to provide a visually distinctive, pulsed, illumination pattern 410.

Upon detecting the occurrence of atmospheric electrical activity at a distance 408 relative to the luminaire 200 that is less than a defined distance threshold value, the control subsystem 102 places the lighting subsystem 104 in the second state. The second state causes the lighting subsystem to generate a luminous output having one or more distinct patterns to warn individuals within line-of-sight of the luminaire 200 of the potentially dangerous nearby atmospheric electrical activity. Such warnings can, for example, advantageously permit persons in exposed areas such as sports fields, parking lots, and similar open areas to seek shelter in a timely manner, thereby reducing the chances of injury or death attributable to the nearby atmospheric electrical activity. Where two or more luminaires 200 are wiredly or wirelessly networked together such systems may advantageously provide users who may not be equipped with formal emergency notification systems (e.g., commercial sites, industrial sites, and small municipalities) with the ability to provide an area wide alert based on detected atmospheric electrical activity.

The control subsystem 102 can vary, alter, or adjust one or more aspects of the luminous output of the lighting subsystem 104 while in the second state. For example, in some instances, upon detecting atmospheric electrical activity, the control subsystem may cause the lighting subsystem 104 to generate a pulsing luminous output at a particular frequency. The particular frequency of the pulsing luminous output may indicate the approximate distance 408 between the luminaire 200 and the detected atmospheric electrical activity. A higher frequency (e.g., a more rapid pulsing of the luminous output) may indicate a very short distance to the detected atmospheric electrical activity while a lower frequency (e.g., a less rapid pulsing of the luminous output) may indicate a greater distance between the detected atmospheric electrical activity and the luminaire.

In another example, the intensity of the luminous output may indicate the approximate strength of the detected atmospheric electrical activity. A greater intensity may indicate the approximate strength of the detected atmospheric electrical activity is relatively high, while a lesser intensity may indicate the approximate strength of the detected atmospheric electrical activity is relatively low.

Figure 5:
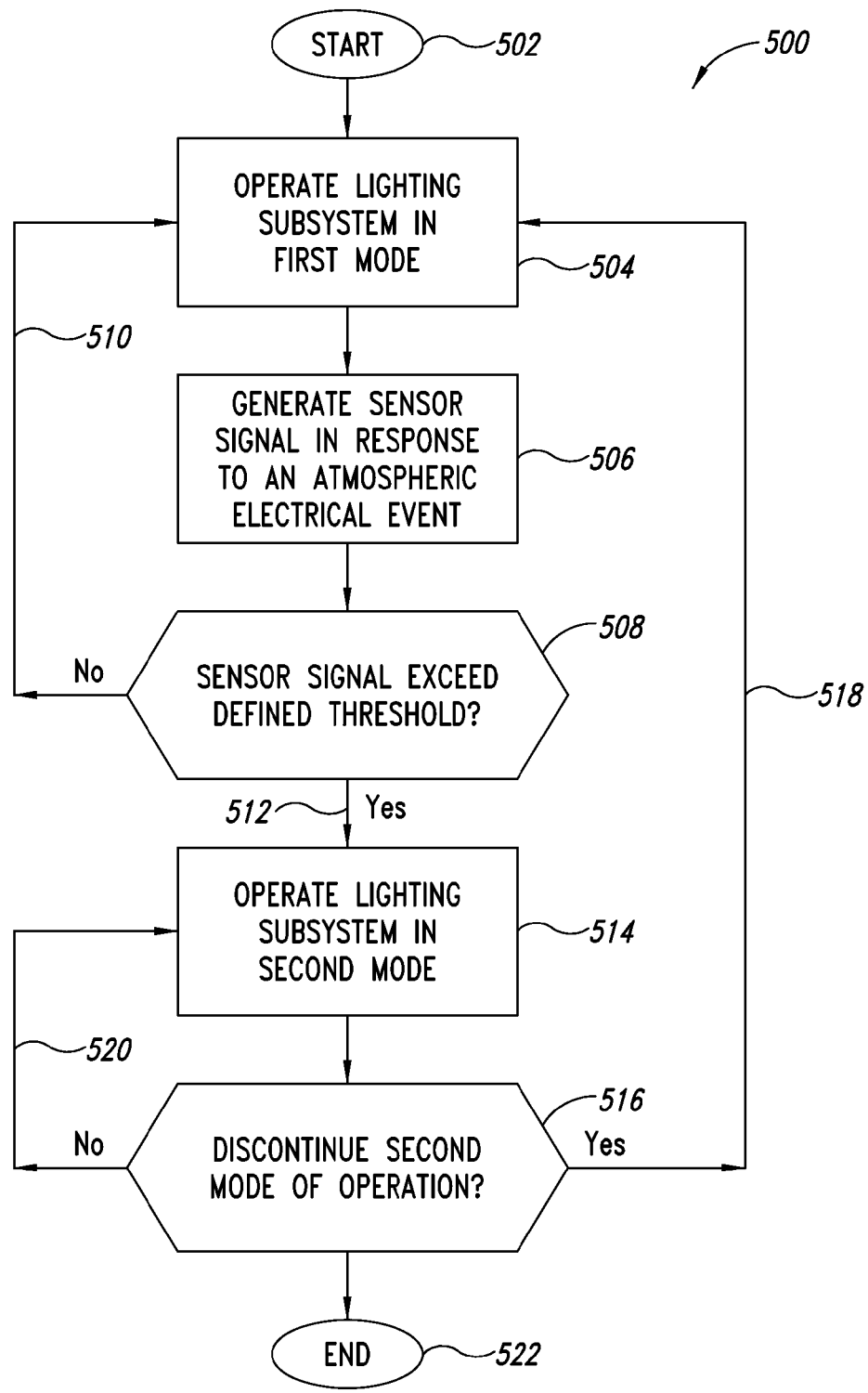
FIG. 5 is a flow diagram showing a high level method of operating a luminaire capable of providing at least a first state and a second state, according to one non-limiting illustrated embodiment.

FIG. 5 shows a high level method 500 of operating a luminaire 200 having at least a first state and a second state, according to one or more embodiments. The luminous output of the lighting subsystem 104 in first state is determined at least in part on the detected occurrence of a solar event or the expected occurrence of a solar event. The luminous output of the lighting subsystem 104 in the second state is determined at least in part on the detection of atmospheric electrical activity. In at least some instances, placing the lighting subsystem 104 in the second state can interrupt or otherwise abort the first state. In other instances, placing the lighting subsystem 104 in the second state causes the simultaneous execution of machine executable instructions associated with both states (i.e., the first and second states are at least in part executed simultaneously by the control subsystem 102). The method commences at 502.

At 504, the control subsystem 102 causes the lighting subsystem 104 to operate in the first state, for example a dusk-to-dawn sensing state. While in the first state, the control subsystem 102 will adjust or otherwise control the luminous output operation and/or intensity of the lighting subsystem 104 in response to one or more detected solar events or one or more expected solar events. For example, where the luminaire 200 is equipped with at least one photosensitive transducer 214, the control subsystem 102 may control the operation and/or intensity of the luminous output of the lighting subsystem 104 based on sensed decreases in ambient light levels (e.g., sunsets) and increases in ambient light levels (e.g., sunrises) when in the first state. In at least some instances, the intensity of the luminous output of the lighting subsystem 104 may be increased or decreased in relation to the sensed increase or decrease in ambient lighting conditions. In another example, where the control subsystem 102 may not be equipped with a photosensitive transducer 214, the control subsystem may control the operation and/or intensity of the luminous output of the lighting subsystem 104 using one or more real time clocks 218 or timer circuits 219 based at least in part on a calculated or retrieved expected time of occurrence of one or more solar events.

The control subsystem 102 may maintain the lighting subsystem 104 in the first state indefinitely in the absence of detected atmospheric electrical activity exceeding one or more defined thresholds.

At 506, the electrical activity sensor 212 generates one or more sensor output signals including data indicative of at least one aspect of a sensed atmospheric electrical event. Such aspects can include, but are not limited to, data indicative of the electromagnetic intensity of an atmospheric electrical activity, data indicative of the optical intensity of an atmospheric electrical activity, or data indicative of the acoustic intensity of an atmospheric electrical activity. In at least some instances, more than one type or number of electrical activity sensor 212 may be used to generate the one or more sensor output signals. The use of such mixed sensor types may include, but is not limited to the use of an optical atmospheric electrical activity sensor and the use of an acoustic atmospheric electrical activity sensor to determine one or more properties of the senses atmospheric electrical activity. For example, using an optical and acoustic sensor, an approximate distance to the atmospheric electrical activity based on the sensed optical event (e.g., the flash of lightning) and the sensed acoustic event (e.g., the clap of thunder).

At 508, the control subsystem compares one or more aspects of the sensor signal output generated by the at least one electrical activity sensor 212 at 506 with one or more defined sensor values to determine whether an atmospheric electrical event has occurred. In at least some instances, for example atmospheric electrical activity occurring at a distance greater than a first defined threshold (e.g., 25 miles away from the luminaire) may provide a sufficiently low likelihood of lightning strikes proximate the luminaire 200 that the control subsystem 102 determines placement of the lighting subsystem 104 in the second state is inappropriate. Under such circumstances, the control subsystem 102 will maintain the lighting subsystem 104 in the first state at 510 until the control subsystem 102 determines the sensed atmospheric electrical activity exceeds one or more defined threshold values.

In other instances, for example atmospheric electrical activity occurring at a distance less than the first defined threshold (e.g., between 10 and 25 miles away from the luminaire) may provide a sufficiently high risk of lightning strikes proximate the luminaire 200 that the control subsystem 102 determines it appropriate to place the lighting subsystem 104 in the second state at 512.

At 514, the control subsystem 102 places the lighting subsystem 104 in the second state. As discussed above, while in the second state, the control subsystem 102 can adjust or otherwise control one or more aspects of the luminous output of the lighting subsystem 104. For example, if the control subsystem 102 generates a pulsing luminous output at a first frequency responsive to the detection of an atmospheric electrical activity at a distance 410, in at least some instances the control subsystem 102 may increase the pulsation frequency responsive to a detected decrease in the distance 410 between the atmospheric electrical activity and the luminaire 200. Conversely, in other instances the control subsystem 102 may decrease the pulsation frequency of the luminous output responsive to a detected increase in the distance 410 between the atmospheric electrical activity and the luminaire 200.

At 516, the control subsystem 102 determines whether sensed atmospheric electrical activity renders continued operation of the lighting subsystem 104 in the second state appropriate. In the presence of atmospheric electrical activity in excess of the defined threshold, the lighting subsystem 104 is maintained in the second state by the control subsystem 102 at 520. The control subsystem 102 can consider one or more factors when determining whether to discontinue the second state. In some instances, the control subsystem 102 may use a time based factor, for example the second state is discontinued if no atmospheric electrical activity exceeding the defined threshold value is detected for a period "N," where "N" is a reprogrammable number of minutes (e.g., 10 minutes). In other instances, the control subsystem 102 may use a time based factor, for example the second state is discontinued if no atmospheric electrical activity exceeding the defined threshold value is detected within a distance of "M" of the luminaire 200, where "M" is a reprogrammable number of distance units (e.g., 25 miles, 40 kilometers, etc.).

In at least some instances, the control subsystem 102 may be manually instructed to discontinue the second state, for example by communicating one or more sets of instructions from a portable handheld device such as a cellular phone, smart phone, personal digital assistant, portable computer, or the like. In other instances, the control subsystem 102 may be manually instructed to discontinue the second state via one or more network connections. When the second state is either autonomously or manually discontinued, the lighting subsystem 104 is placed back into the first state at 518. The method concludes at 522.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other contexts, not necessarily the exemplary context of controlling operations of an illumination system generally described above.

For example, while the illumination systems are generally described above as embodied in a luminaire, the control subsystem may control multiple luminaires. As used herein and in the claims, "luminaire" is used in its broadest sense to refer to any lighting fixture or structure. While a single step adjustment downward and upward in the level of illumination has been described and illustrated, illumination level may be adjusted in multiple steps, or even continuously to gradually ramp downward some time after turning ON the light source, then eventually back upward some time before turning OFF the light source. Additionally, or alternatively, the embodiments described herein may be combined with motion or proximity detecting, either as implemented by a luminaire control mechanism or by a retrofit or integral control subsystem.

The microcontroller 210 may be programmable and may include one or more input ports (not illustrated) through which a user can program the microcontroller 210. Such input ports may be wired or wireless ports. Example wired ports include universal serial bus (USB), IEEE 1394 (FireWire®), or proprietary bus connectors. In some instances, such input ports may include an interface communicably coupled to the power grid such that one or more signals may be driven across the power grid. For example, the time delays and the various illumination levels of the at least one solid-state light source 308 may be programmed. The input port may include switches and/or potentiometers that can be used to set, alter, adjust, or program the microcontroller 210. Alternatively, the input port may include an electrical interface for the user to remotely program the microcontroller 210 whether through a wire or wirelessly. In one embodiment, the input port may be the ambient light sensor which is connected to the microcontroller 210. In one embodiment, the microcontroller 210 is programmable optically via one or more images captured by an image capture device or imager (not illustrated). In one embodiment, printed barcode pages are used to set delay times and other parameters used by the microcontroller 210. The microcontroller 214 may also receive a one-bit input via the input port to activate or deactivate the light source. For example, a binary bit of "0" turns OFF the light source 120 and a binary bit of "1" turns ON the light source.

Also for example, the various methods may include additional acts, omit some acts, and may perform the acts in a different order than set out in the various flow diagrams. The use of ordinals such as first, second and third, do not necessarily imply a ranked sense of order, but rather may only distinguish between multiple instances of an act or structure.

Also for example, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by one or more controllers (e.g., microcontrollers), as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure. For example, the control subsystem may include an analog electronic delay circuit such as a capacitor based timer circuit with defined delay times, to implement one or more of the specific adjustment times (e.g., times as indicated by the clock when light sources will be turned ON, decreased output, increased output, turned OFF).

When logic is implemented as software and stored in memory, logic or information can be stored on any computer-readable medium for use by or in connection with any processor-related system or method. In the context of this disclosure, a memory is a computer-readable storage medium that is an electronic, magnetic, optical, or other physical device or means that non-transitorily contains or stores a computer and/or processor program. Logic and/or information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. patent application Ser. No. 13/558,191, filed Jul. 25, 2012; U.S. Pat. No. 8,118,456; U.S. Patent Publication No. US 2009/0284155, published Nov. 19, 2009; U.S. Patent Publication No. US 2010/0090577, published Apr. 15, 2010; U.S. Provisional Patent Application No. 61/052,924, filed May 13, 2008; U.S. Provisional Patent Application No. 61/088,651, filed Aug. 13, 2008; U.S. Provisional Patent Application No. 61/154,619, filed Feb. 23, 2009; U.S. Provisional Patent Application No. 61/180,017, filed May 20, 2009; U.S. Provisional Patent Application No. 61/229,435, filed Jul. 29, 2009; U.S. Non-Provisional patent application Ser. No. 12/619,535, filed Nov. 16, 2009; U.S. Provisional Patent Application No. 61/295,519 filed Jan. 15, 2010; U.S. Non-Provisional patent application Ser. No. 12/769,956, filed Apr. 29, 2010; U.S. Provisional Patent Application Ser. No. 61/333,983, filed May 12, 2010; U.S. Nonprovisional patent application Ser. No. 12/784,091, filed May 20, 2010; and U.S. Provisional Patent Application Ser. No. 61/346,263, filed May 19, 2010; U.S. Patent Application Publication No. 2010/0295455, published Nov. 25, 2010; and U.S. patent application Ser. No. 13/558,191 filed Jul. 25, 2012, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system to visually warn of atmospheric electrical activity, the system comprising:
 a housing; and
 a control subsystem including:
  at least one atmospheric electrical activity sensor that produces a sensor signal responsive to an occurrence of atmospheric electrical activity, the sensor signal including at least one aspect representative of sensed atmospheric electrical activity;
  a nontransitory storage media to store at least one of machine executable instructions or data; and
  at least one controller communicatively coupled to the at least one atmospheric electrical activity sensor, communicatively coupled to the nontransitory storage media, and communicatively coupled to a lighting subsystem, the controller responsive to the sensor signal to selectively interrupt a first state of the lighting subsystem, in which a luminous output of the lighting subsystem is controlled responsive to at least one of a detected solar event or a expected solar event, with a second state.

2. The system of claim 1 wherein the at least one aspect representative of sensed atmospheric electrical activity includes data indicative of a distance between the control subsystem and the sensed atmospheric electrical activity.

3. The system of claim 1 wherein, in the second state the lighting subsystem provides a visually distinguishable luminous output pattern.

4. The system of claim 3 wherein the luminous output pattern includes a pulsating luminous output that occurs at one or more frequencies determined by the at least one controller.

5. The system of claim 4 wherein the at least one controller adjusts the frequency of the pulsating luminous output in relation to a determined distance between the control subsystem and the sensed atmospheric electrical activity.

6. The system of claim 1 wherein, when in the first state the at least one controller operates the lighting subsystem to provide a luminous output responsive to at least one of an expected sunrise event or an expected sunset event;
wherein the nontransitory storage media includes data indicative of at least one of a current time, a current date, a current latitude of the control subsystem, or a current longitude of the control subsystem; and
wherein the controller determines analytically at least one of the expected sunrise event or the expected sunset event.

7. The system of claim 1 wherein the control subsystem further comprises a photosensitive transducer; and
wherein, when in the first state the at least one controller operates the lighting subsystem to provide a luminous output in response to an output from the photosensitive transducer that is indicative of at least one of a sensed sunrise event or a sensed sunset event.

8. The system of claim 1 wherein the atmospheric electrical activity sensor includes at least one electromagnetic pulse sensor.

9. The system of claim 8 wherein the at least one aspect of the sensor signal comprises data representative of an electromagnetic pulse intensity; and
wherein the controller determines a distance between the control subsystem and the atmospheric electrical activity based at least in part on the data representative of the electromagnetic pulse intensity.

10. The system of claim 1 wherein the atmospheric electrical activity sensor includes at least one optical sensor.

11. The system of claim 10 wherein the at least one aspect of the sensor signal comprises data representative of atmospheric electrical optical intensity; and
wherein the controller determines a distance between the control subsystem and the atmospheric electrical activity based at least in part on the data representative of the atmospheric electrical optical intensity.

12. The system of claim 1 wherein the atmospheric electrical activity sensor includes at least one acoustic sensor.

13. The system of claim 12 wherein the at least one aspect of the sensor signal comprises data representative of atmospheric electrical acoustic intensity; and
wherein the controller determines a distance between the control subsystem and the atmospheric electrical activity based at least in part on the data representative of the atmospheric electrical acoustic intensity.

14. The system of claim 1 wherein the control subsystem is disposed at least partially within the housing;
wherein the housing includes one or more features to physically couple the housing to a stationary luminaire; and
wherein the lighting subsystem is disposed at least partially in the stationary luminaire.

15. The system of claim 1 wherein the nontransitory storage media further includes data indicative of a number of defined thresholds, each of the number of defined thresholds associated with a respective aspect of the sensor signal.

16. The system of claim 15 wherein the at least one controller maintains the lighting subsystem in the second state until at least one aspect of the sensor signal falls below the respective defined threshold.

17. The system of claim 16 wherein the one or more aspects include at least one of: a frequency of occurrence of atmospheric electrical activity and a distance between the atmospheric electrical activity and the control subsystem.

18. The system of claim 1 wherein the control subsystem further comprises at least one communications interface;
wherein the controller generates at least one alert output signal at the communications interface, the at least one alert output signal including data representative of the sensed atmospheric electromagnetic activity.

19. The system of claim 1 wherein the lighting subsystem comprises at least a driver circuit electrically coupled to one or more solid state light sources, the driver circuit having at least a pulse width modulated control signal input to vary the luminous output of the one or more solid state light sources;
wherein the control subsystem generates a pulse width modulated control signal output that is communicably coupled to the driver circuit pulse width modulated control signal input; and
wherein the control subsystem provides a pulse width modulated control signal output to the driver circuit pulse width modulated control signal input in either of the first state or the second state.

20. A method of operating a luminaire to provide a visual indication of atmospheric electrical activity, the method comprising:
generating by a control subsystem one or more signals that place a lighting subsystem in a first state in which a luminous output of the lighting subsystem is controlled responsive to at least one of a detected solar event or a expected solar event;
responsive to the occurrence of an atmospheric electrical event generating a sensor signal by at least one atmospheric electrical activity sensor, the sensor signal including data representative of at least one aspect of the atmospheric electrical event;
determining by the control subsystem whether the data representative of at least one aspect of the atmospheric electrical event in the sensor signal has exceeded a respective defined threshold; and
responsive to the determination that at least one aspect of the sensor signal exceeds a defined threshold, interrupting the first state and placing the lighting subsystem in a second state by the at least one control subsystem.

21. The method of claim 20, further comprising:
generating by the lighting subsystem one or more visually distinguishable luminous output patterns while in the second state.

22. The method of claim 20 wherein determining whether the data representative of at least one aspect of the atmospheric electrical event in the sensor signal has exceeded a respective defined threshold includes:
determining whether the at least one aspect of the sensor signal data representative of an atmospheric electrical electromagnetic pulse intensity has exceeded a defined atmospheric electrical electromagnetic pulse intensity threshold.

23. The method of claim 20 wherein determining whether the data representative of at least one aspect of the atmospheric electrical event in the sensor signal has exceeded a respective defined threshold includes:
determining whether the at least one aspect of the sensor signal data representative of an atmospheric electrical optical intensity has exceeded a defined atmospheric electrical optical intensity threshold.

24. The method of claim 20 wherein determining whether the data representative of at least one aspect of the atmospheric electrical event in the sensor signal has exceeded a respective defined threshold includes:
determining whether the at least one aspect of the sensor signal data representative of an atmospheric electrical acoustical intensity has exceeded a defined atmospheric electrical acoustical intensity threshold.

25. The method of claim 21, further comprising:
determining by the at least one control subsystem an approximate distance between the luminaire and the atmospheric electrical activity based at least in part on the at least one aspect of the sensor signal.

26. The method of claim 25 wherein generating by the lighting subsystem one or more visually distinguishable luminous output patterns while in the second state includes:
generating a pulsating luminous output at a frequency when in the second state; and
adjusting the frequency of the pulsating luminous output based at least in part on the determined approximate distance between the luminaire and the atmospheric electrical activity using the control subsystem.

27. The method of claim 20 wherein generating one or more signals that place a lighting subsystem in a first state in which a luminous output of the lighting subsystem is controlled responsive to at least one of a detected solar event or a expected solar event includes:
determining whether at least one aspect of transducer data received by the control subsystem from one or more communicably coupled photosensitive transducers is representative of at least one of a sunrise event or a sunset event; and
adjusting the luminous output of the lighting subsystem by the control subsystem in response to the at least one aspect of the transducer data representative of at least one of the sensed sunrise event or the sensed sunset event.

28. The method of claim 21 wherein generating one or more signals that place a lighting subsystem in a first state in which a luminous output of the lighting subsystem is controlled responsive to at least one of a detected solar event or a expected solar event includes:
determining by the control subsystem at least one of an expected sunrise event or an expected sunset event; and
adjusting the luminous output of the lighting subsystem by the control subsystem in response to the expected sunrise event or the expected sunset event.

29. The method of claim 28 wherein determining by the control subsystem at least one of an expected sunrise event or an expected sunset event includes at least one of:
calculating, using one or more analytical relationships, data indicative of at least one of the expected sunrise event or the expected sunset event using at least one of a current time, a current date, or a current location of the luminaire; or
retrieving from one or more data tables stored in a nontransitory storage media communicably coupled to the control subsystem data indicative of at least one of the expected sunrise event or the expected sunset event.

* * * * *